(12) United States Patent
Disser et al.

(10) Patent No.: US 8,118,683 B2
(45) Date of Patent: *Feb. 21, 2012

(54) JOINT SHAFT AND ROLLER DISPLACEMENT UNIT THEREFOR

(75) Inventors: Claus Disser, Seligenstadt (DE); Mathias Lutz, Tuebingen (DE)

(73) Assignee: Shaft-Form-Engineering GmbH, Muehlheim (DE)

( * ) Notice: Subject to any disclaimer, the term of this patent is extended or adjusted under 35 U.S.C. 154(b) by 883 days.

This patent is subject to a terminal disclaimer.

(21) Appl. No.: 12/088,405

(22) PCT Filed: Sep. 26, 2006

(86) PCT No.: PCT/EP2006/009342
§ 371 (c)(1),
(2), (4) Date: Jun. 9, 2008

(87) PCT Pub. No.: WO2007/036343
PCT Pub. Date: Apr. 5, 2007

(65) Prior Publication Data
US 2008/0248886 A1    Oct. 9, 2008

(30) Foreign Application Priority Data

Sep. 27, 2005 (DE) ............. 10 2005 046 301
Sep. 19, 2006 (DE) ............. 10 2006 044 590

(51) Int. Cl.
*F16C 3/03* (2006.01)
(52) U.S. Cl. .................. 464/167; 464/906
(58) Field of Classification Search .......... 464/167, 464/165, 906, 183, 179, 145, 182; 280/777
See application file for complete search history.

(56) References Cited

U.S. PATENT DOCUMENTS

| | | | |
|---|---|---|---|
| 5,611,733 A | 3/1997 | Jacob et al. | |
| 6,241,617 B1 | 6/2001 | Jacob | |
| 6,306,045 B1 | 10/2001 | Jacob | |
| 6,379,255 B1 | 4/2002 | Cermak et al. | |
| 6,390,928 B1 * | 5/2002 | Welschof et al. | 464/145 X |
| 6,510,756 B2 * | 1/2003 | Aota | 280/777 X |
| 6,872,143 B2 * | 3/2005 | Weckerling et al. | 464/145 |
| 7,004,842 B2 * | 2/2006 | Fairchild et al. | 464/906 X |
| 7,018,299 B2 * | 3/2006 | da Silva | 464/167 |
| 7,025,686 B1 * | 4/2006 | Aiken | 464/162 |
| 7,281,984 B2 * | 10/2007 | Foster-Hamilton et al. | |
| 7,361,094 B2 | 4/2008 | Cermak | |
| 7,670,229 B2 * | 3/2010 | Disser et al. | 464/183 X |
| 2003/0171154 A1 * | 9/2003 | Farrace et al. | |
| 2003/0181246 A1 | 9/2003 | Amborn | |
| 2004/0137992 A1 | 7/2004 | Hildebrandt et al. | |

(Continued)

FOREIGN PATENT DOCUMENTS

DE    41 13 709 A1    10/1992

(Continued)

*Primary Examiner* — Gregory Binda
*Assistant Examiner* — Matthieu Setliff
(74) *Attorney, Agent, or Firm* — Crowell & Moring LLP

(57) ABSTRACT

A jointed shaft with two shaft sections which are connected together in a rotationally fixed manner via a central shaft which is constructed as a constant velocity fixed joint. A constant velocity fixed joint is also arranged on the end of each of the shaft sections which is oriented away from the central joint. At least one roller displacement unit, which enables both shaft sections to be displaced in an axial manner in relation to each other, is also provided.

15 Claims, 2 Drawing Sheets

U.S. PATENT DOCUMENTS

Figure 1:
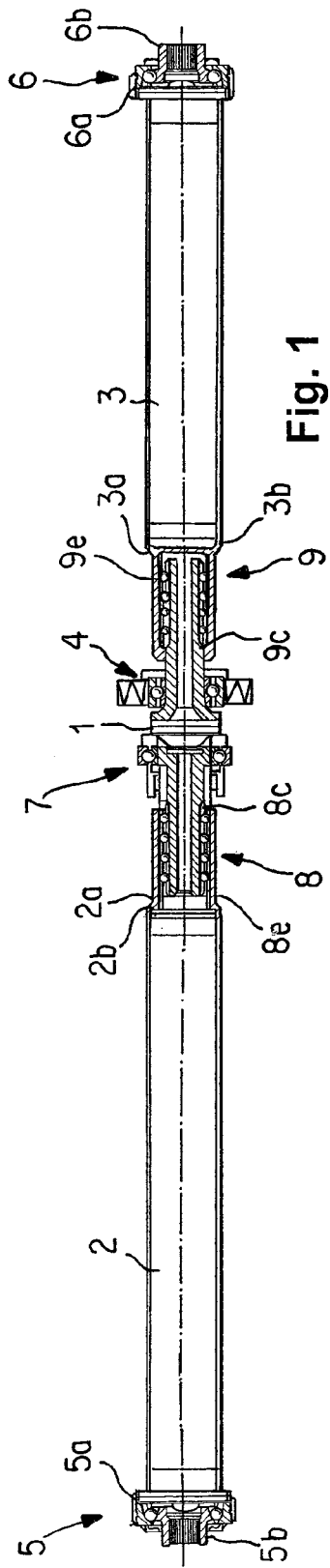

| | | |
|---|---|---|
| 2004/0152528 A1* | 8/2004 | Okude et al. |
| 2004/0157670 A1* | 8/2004 | Lyon et al. .................... 464/183 |
| 2006/0014587 A1* | 1/2006 | Jacob |
| 2006/0068924 A1* | 3/2006 | Yamada ........................ 464/167 |
| 2010/0227696 A1* | 9/2010 | Disser ........................... 464/145 |

FOREIGN PATENT DOCUMENTS

| | | |
|---|---|---|
| DE | 44 19 373 A1 | 12/1995 |
| DE | 198 31 016 A1 | 1/2000 |
| DE | 199 11 111 C1 | 1/2001 |
| DE | 199 43 880 C1 | 6/2001 |
| DE | 102 08 325 C1 | 9/2003 |
| DE | 102 13 117 A1 | 11/2003 |
| DE | 102 50 419 B3 | 8/2004 |
| DE | 10 2004 005 096 B3 | 8/2005 |
| DE | 20 2005 007 718 U1 | 8/2005 |
| DE | 103 53 674 B3 | 8/2005 |
| DE | 11 2004 000 239 T5 | 1/2006 |
| DE | 10 2005 046 301 A1 | 4/2007 |
| EP | 1 553 005 A1 | 7/2005 |
| WO | WO 80/01939 A1 | 9/1980 |

* cited by examiner

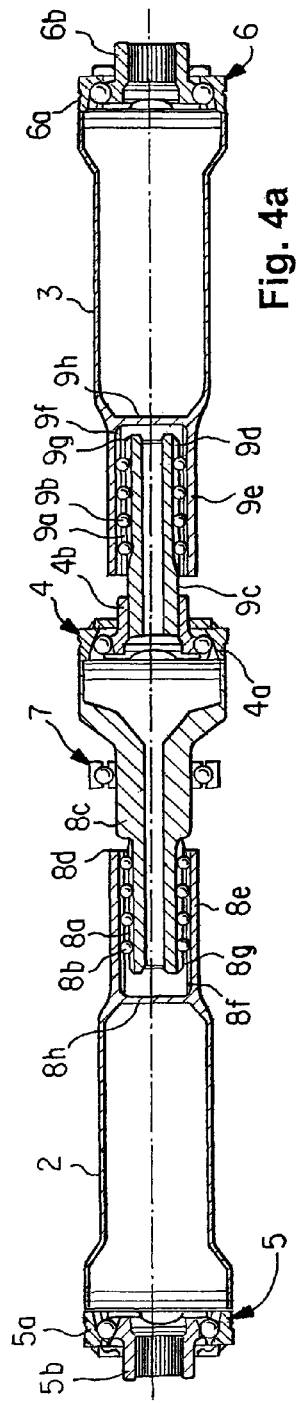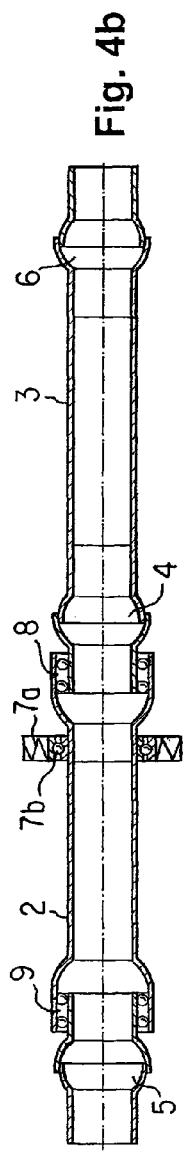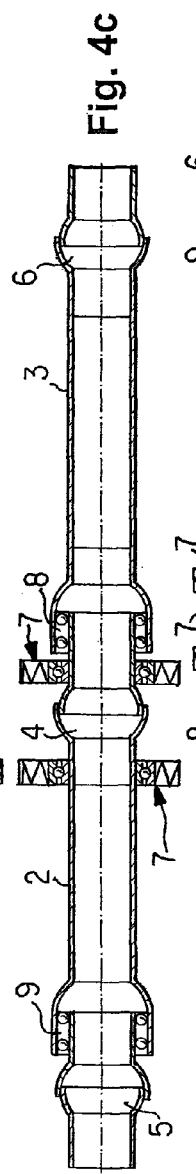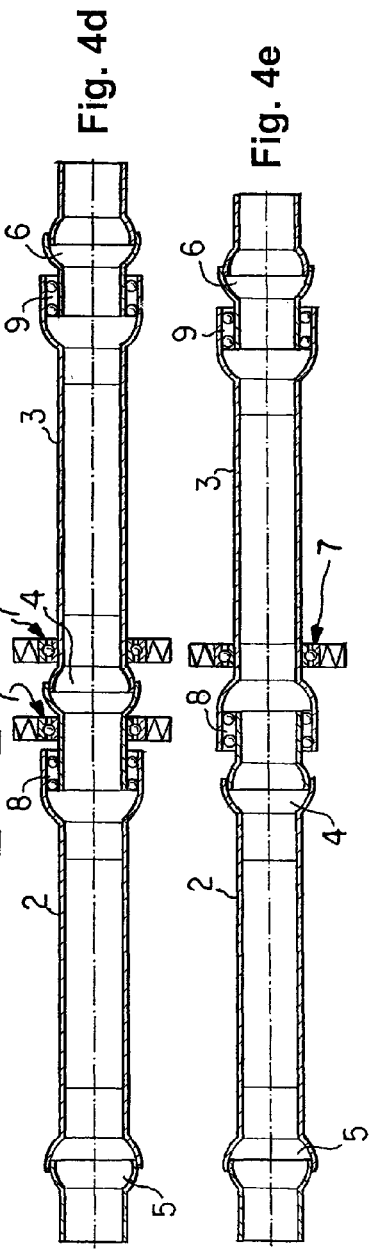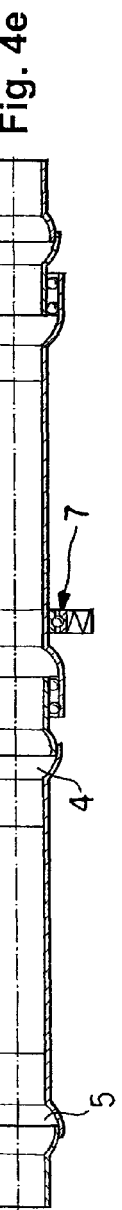

JOINT SHAFT AND ROLLER DISPLACEMENT UNIT THEREFOR

The invention relates to a jointed shaft with two shaft sections which are connected to each other in a rotationally fixed manner by a center joint that is designed as a fixed constant velocity joint, such that a fixed constant velocity joint is arranged at the end of each shaft section opposite the center joint and two rolling displacement units are provided. The invention further relates to a rolling displacement unit for such a jointed shaft.

Jointed shafts are used as longitudinal shafts, for example, to connect the front-end transmission output to the rear-end differential input of a motor vehicle. Such longitudinal shafts are known, for example, from German publications DE 102 08 325 C1 and DE 11 2004 000 239 T5. These jointed shafts use slip joints to enable axial movement between the shaft sections. The limited displacement paths of these joints are considered a drawback in some applications. In addition, the costs of such a jointed shaft increase when many different components are used.

To largely decouple vibrations longitudinally introduced into jointed shaft arrangements, German Publication DE 198 31 016 C2 proposes a jointed shaft of the aforementioned type having two displacement elements that are arranged radially within the transmission-side or the differential-side fixed joint. This known jointed shaft arrangement is connected using a flange formed on the outer hub of the transmission-side or the differential-side fixed joint, respectively. The flange is connected to a flange of the transmission output or the differential input by an annular damping element.

This design entails a large diameter and therefore a large mass of both the transmission-side and the differential-side fixed joints. As a result, particularly in combination with the flanged connection, (residual) imbalances occur which lead to undesirable noise. In addition, the entire longitudinal shaft can axially move relative to the transmission output and the differential input in operation because of the axial displaceability in the displacement elements. This not only subjects the center bearing arranged near the center joint to greater stress but also causes noise because of the transmission of axial forces and because of the vibration behavior of the center joint.

To prevent buckling of the jointed shaft in a head-on collision of a vehicle, in which the longitudinal shaft is subject to high axial loading because of the compression of the vehicle, and thereby to prevent the risk that the jointed shaft will penetrate the passenger compartment, it is necessary to enable an axial shortening of the jointed shaft. The displacement elements disclosed in German Publication DE 198 31 016 C2 make this possible only to a very limited degree, so that the vehicle occupants can be at risk when the longitudinal shaft buckles.

In contrast, it is an object of the present invention to provide a jointed shaft of the aforementioned type, which offers reduced noise in operation while minimizing weight and increased safety even in a head-on collision.

It is a further object of the invention to make the fixed constant velocity joints particularly compact, to save weight and to reduce the residual imbalances in a jointed shaft. In addition, the axial forces acting on the center bearing are to be substantially reduced and the vibration behavior of the intermediate bearing is to be improved, so that noise development is also reduced. It is a further object of the present invention to make the jointed shaft particularly cost-effective and to use as many identical components as possible. Moreover, assembly and disassembly are to be made easier and different assembly sequences are also to be made possible.

According to the invention, these objects are achieved in a jointed shaft by arranging at least one of the rolling displacement units near the center joint. The rolling displacement unit is preferably associated with the center joint and provided in such a way that the two shaft sections are axially movable relative to each other. By arranging at least one rolling displacement unit at a location remote from the transmission output or the differential input it is possible to make both the rolling displacement unit and the fixed constant velocity joints particularly compact. This produces substantial weight savings and because of the smaller masses also lower residual imbalances. As a result, noise development in operation of the jointed shaft according to the invention can be reduced.

The axial forces acting on the center bearing are also substantially reduced because at least one rolling displacement unit is arranged near the center joint and therefore near the intermediate bearing. This axial force decoupling also has the effect of reducing noise in operation. Furthermore, in the embodiment of the jointed shaft according to the invention an intermediate bearing does not have to be axially flexible, so that possible noise development because of the vibration behavior of the intermediate bearing is also reduced.

A further development of the inventive concept provides for two rolling displacement units to be associated with and arranged near the center joint of the jointed shaft. If both rolling displacement units are positioned substantially in the center of the jointed shaft, it is possible to use three identically constructed fixed constant velocity joints for the jointed shaft. The jointed shaft according to the invention is therefore made of only a very small number of different components, which results in substantial cost savings based on the principle of using identical parts.

To minimize the masses present in the area where the jointed shaft is connected to a transmission or differential, the rolling displacement units are arranged as far from the connecting points as possible, for example, in the center of the jointed shaft. Therefore in the jointed shaft, at most the very small masses of the outer fixed constant velocity joints contribute to potential imbalances of the entire system with possibly existing minimal journal eccentricities.

In this embodiment of the jointed shaft, assembly is also facilitated compared to conventional jointed shafts. For example, the two shaft sections can be axially moved in relation to each other, thereby enabling a very large displacement path. This results in a very small installation and deinstallation length, making assembly and disassembly significantly easier. In addition, different assembly sequences can be used as a function of the other requirements and boundary conditions. Assembly can also be carried out on the vehicle floor, for example, starting with the center bearing.

According to another embodiment of the invention, one of the two rolling displacement units can be associated with and arranged near the center joint and the other of the two rolling displacement units can be associated with and arranged near the transmission-side or differential-side fixed constant velocity joint. The two rolling displacement units can be provided on the same shaft section or each on a different shaft section. These two embodiments ensure that the two shaft sections are axially displaceable in relation to each other and at least one rolling displacement unit is positioned near the center joint.

To save weight, the two shaft sections of the jointed shaft are at least partly tubular. Preferably the fixed constant velocity joints provided at the end of each shaft section opposite the center joint, i.e., the transmission-side or the differential-side fixed joints, are each connected to the shaft sections with their outer hubs. The inner hub of the transmission-side or the differential-side fixed joint can be provided with a profiled receiving opening, so that a transmission output journal or a differential input journal can be inserted into the inner hub in a rotationally fixed manner. This simplifies assembly compared to the known flanged connection.

To prevent imbalances, jointed shafts are typically balanced at the end of production. A problem in the known jointed shafts that are connected by flanged connections, that is to say over a large diameter, is that possible eccentricities, which result at the connecting points only when the shaft is installed in the vehicle, negatively affect the balance quality of the entire system despite the high balance quality of the jointed shaft as an individual component. In the jointed shafts according to the invention, centering at the connecting points is realized directly via journals inserted into the inner hubs of the fixed constant velocity joints. This has the effect of substantially reducing imbalances because of the improved centering via the journal connection. Noise occurring in operation can also be reduced as a result.

The elimination of the flange in this insertion solution further saves weight in the fixed constant velocity joints. In addition, the highly compact design of the fixed constant velocity joint with a slip joint increases the design freedom regarding the remaining vehicle components and reduces the overall space required. The center joint can likewise be provided with an inner hub, which makes possible a slip coupling with one of the rolling displacement units, for example.

Preferably the at least one rolling displacement unit associated with and arranged near the center joint is formed by a profiled sleeve which is provided on one of the shaft sections and has axially extending grooves and a journal which is connected to the center joint and has axially extending grooves and torque-transmitting balls arranged in the mutually associated groove pairs. Preferably a plurality of balls is arranged in the mutually associated grooves of the journal and the profiled sleeve and can be guided in a common cage.

A further development of this inventive concept provides that the journal of a rolling displacement unit is connected to the inner hub of the center joint and the journal of the additional displacement unit is connected to the outer hub of the center joint. Preferably the journal of the rolling displacement unit connected to the inner hub of the center joint is coupled to this inner hub via a slip joint. The journal of the other rolling displacement unit is preferably welded to the outer hub of the center joint.

To prevent too large an axial movement of the jointed shaft during operation or before or during assembly, the rolling displacement units can have stop means to limit the axial displacement path of balls and/or a cage guiding the balls. The stop means are designed such that the axial path that the balls can travel by rolling is limited so that, optionally, when the stop means is reached, an additional displacement by sliding or slipping of the balls within the grooves is still possible.

The jointed shaft is usually fixed to the vehicle body in proximity of the center joint. To this end, an intermediate bearing is preferably provided, which supports the journal of at least one rolling displacement unit. The intermediate bearing can be designed such that a rolling-contact bearing is provided on the journal of the rolling displacement unit. The rolling-contact bearing is held in a flexible damping element that is fixed to the vehicle body.

The object underlying the invention is further achieved by a rolling displacement unit that can in particular be a component of a jointed shaft of the above-described type. The rolling displacement unit has a profiled sleeve, the inner face of which has outer running tracks (grooves) at least in part, a journal axially displaceable in the profiled sleeve, the outer face of which has inner running tracks (grooves) at least in part and balls arranged for torque transmission in outer running tracks and inner running tracks that are associated with each other in pairs. The profiled sleeve is connected via a predetermined breaking point to a connecting segment whose inside diameter is greater than or substantially equal to the outside diameter of the profiled sleeve. If the rolling displacement unit is provided in a jointed shaft, the connecting segment can be connected to or formed by a tubular shaft section.

In this embodiment of the rolling displacement unit, the predetermined breaking point ruptures in a frontal crash because of the axial force acting on the rolling displacement unit, so that the profiled sleeve can move into the connecting segment and the optional adjoining hollow shaft section.

The greater or substantially equal inside diameter of the connecting segment compared to the profiled sleeve makes possible a largely force-free displacement of the profiled sleeve. As an alternative it may be useful if deformation energy is absorbed in a crash during the change in length of the rolling displacement unit. This can be achieved by making the connecting segment and the adjoining shaft section slightly smaller than the outside diameter of the profiled sleeve, optionally after an insertion segment. The profiled sleeve can then still be safely inserted into the connecting segment without any risk that it will buckle, but impact energy is additionally absorbed. To this end, slightly deformable ribs or similar protrusions can be provided along the inner face of the connecting segment and/or the outer face of the profiled sleeve.

This embodiment of the rolling displacement unit enables a deformation of the rolling displacement unit in a defined direction when a defined force is exceeded. The force at which the predetermined breaking point of the rolling displacement unit fails can be set in a defined manner. Because in the rolling displacement unit according to the invention the entire profiled sleeve and the journal held therein can be displaced into the connecting segment and the optional adjoining tubular shaft, the realizable crash path is very large. However, unlike in a shaft section configured, for example, as a collapsible tube, it is not necessary to provide different and particularly larger tube diameters of the individual shaft segments. The overall space required can therefore be reduced and greater design freedom is afforded in a jointed shaft with such a rolling displacement unit.

It is furthermore preferred if the predetermined breaking point is formed as a connecting region arranged radially between the inner face of the profiled sleeve and the outer face of the connecting segment. To facilitate rupture of the predetermined breaking point, the transitions between the profiled sleeve and the connecting segment can be realized, for example, with small curvature radii. It is also possible to make the predetermined breaking point S-shaped or Z-shaped in cross section. As an alternative or in addition, the predetermined breaking point can be a constriction, notching, perforation and/or a similar weakening of the material. With measures of this type the force at which the predetermined breaking point fails can be adjusted depending on the requirements.

The profiled sleeve, the connecting segment and the predetermined breaking point are configured in such a way that when a defined force acting axially on the profiled sleeve is exceeded, the predetermined breaking point fails and the profiled sleeve is displaceable into the connecting segment to realize a large crash path.

Preferably, the rolling displacement unit is sealed by a cover or a wall on the side opposite the journal. If a cover is provided on the profiled sleeve, the connecting segment and/or the predetermined breaking point, the cover can also serve as a limit stop for the journal, so that in operation or in a crash the journal is not displaced out of the profiled sleeve. However, via an additional predetermined breaking point the cover can also be attached to the profiled sleeve, the connecting segment and/or the first predetermined breaking point, so that in a crash the cover is also separated and the journal can be displaced out of the profiled sleeve. Depending on the design of the rolling displacement unit and the components connected thereto, this can provide an additional displacement path and/or enable additional energy absorption.

Further developments, advantages and possible applications of the invention will become evident from the following description of an embodiment and the drawing. All the described and/or illustrated features, either by themselves or together in any combination, constitute the subject matter of the invention, regardless of their summarization in the claims or the relationship of the claims.

Figure 3:
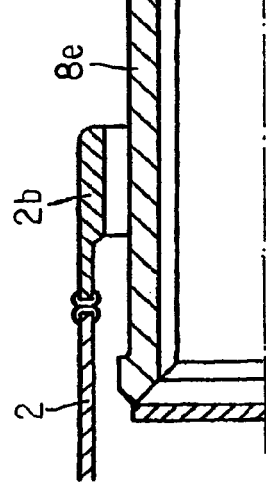
Figure 2:
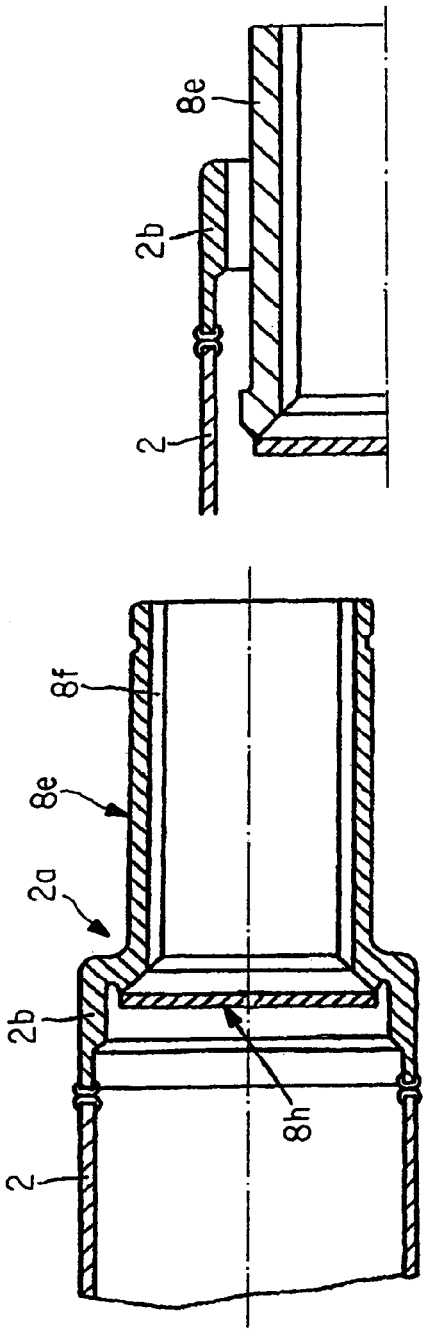

The following show schematically:

FIG. 1 a longitudinal section of a jointed shaft according to a first embodiment of the invention, FIG. 2 a longitudinal section of the profiled sleeve of a rolling displacement unit according to the invention, FIG. 3 a longitudinal section of the profiled sleeve shown in FIG. 2 after a crash, and FIG. 4a-e a longitudinal section of a jointed shaft according to another embodiment of the invention.

The jointed shaft 1 depicted in FIG. 1 has a first shaft section 2 and a second shaft section 3, each of which is formed as a hollow shaft tube. The two shaft sections 2 and 3 are interconnected by a center joint 4, which in the embodiment shown is designed as a fixed opposed path joint. The transmission-side end opposite the center joint of the first shaft section 2 is connected to a transmission-side joint 5. Likewise, the differential-side end opposite the center joint 4 of the shaft section 3 is connected to a differential-side joint 6. The transmission-side joint 5 and the differential-side joint 6 are also designed as fixed opposed path joints.

The center joint 4 is associated with an intermediate bearing 7 with a damper 7a and a rolling-contact bearing 7b, which in the embodiment shown can be attached to the chassis of a vehicle via an elastic element. The center joint 4 is further associated with a first rolling displacement unit 8 by which the center joint 4 is connected to the first shaft section 2 and a second rolling displacement unit 9 by which the center joint 4 is connected to the second shaft section 3.

The fixed opposed path joints 4, 5 and 6 each have an outer hub 4a, 5a, 6a, on the inner face of which outer running tracks are formed. In addition, the fixed opposed path joints each have an inner hub 4b, 5b, 6b configured as a sleeve, into which an axle stub or a shaft end can be inserted in the transmission-side joint 5 and the differential-side joint 6. On the outer face of the inner hub inner running tracks are formed. In the running tracks, which are preferably designed as described in German Publication DE 102 09 933 B4, balls are arranged for torque transmission. The balls are held in openings of a cage that is centered and guided in the outer hub, particularly in cage centering surfaces of the outer hub.

The two rolling displacement units 8 and 9 each have a cage 8a, 9a with a plurality of balls 8b, 9b for torque transmission which are guided in an inner part or journal 8c, 9c with grooves (inner running tracks) 8d, 9d and an outer part designed as a profiled sleeve 8e, 9e with grooves (outer running tracks) 8f, 9f. The journal is displaceable in the profiled sleeve to enable a relative axial movement of the shaft sections 2 and 3.

As shown in FIG. 4a, the displacement path of the cage 8a, 9a, or the path that the balls 8b, 9b can travel by rolling, is limited by stop means 8g, 9g. The axial path of the balls in the direction toward the center joint 4 is furthermore limited by a sloped termination of the grooves 8d, 9d of the journal, against which the balls and/or the cages can abut.

The journal of the second rolling displacement unit 9 is connected to the inner hub of the center joint 4 as shown in FIG. 1. The journal of the first rolling displacement unit 8 is connected to a cap, which encloses the outer hub 4a of the center joint 4 and is connected therewith in a rotationally fixed manner. As an alternative, the outer hub of the center joint can also be directly connected to the journal 8c, as in the embodiment illustrated in FIG. 4a. In this manner, the two rolling displacement units 8 and 9 are associated with and arranged near the center joint 4, so that axial movements of the two shaft sections 2 and 3 are compensated by the rolling displacement units 8 and 9 and are not transmitted through the center joint 4.

As can be seen from the illustration of FIG. 2, a connecting segment 2b is formed on the profiled sleeve to connect the profiled sleeve of the rolling displacement unit 8 to the first shaft section 2. The connecting segment is connected to the profiled sleeve by a predetermined breaking point 2a, which in the embodiment shown extends radially. This predetermined breaking point can be a weakening of the material, such as a constriction, notching, perforation or the like.

In the embodiment shown, the inside diameter of the shaft tube of the first shaft section 2 and the inside diameter of the connecting segment 2b are greater than the outside diameter of the profiled sleeve 8e of the first rolling displacement unit 8. Likewise, the second rolling displacement unit 9 is also connected to the shaft tube of the second shaft section 3 by a connecting segment 3b and a predetermined breaking point 3a. Likewise, in the second rolling displacement unit 9 the outside diameter of the profiled sleeve 9e is smaller than the inside diameter of the second shaft section 3 or the connecting segment 3b. The profiled sleeves of the two rolling displacement units 8 and 9 are each closed by a cover 8h, 9h, which is connected to the respective profiled sleeve 8e, 9e by electron welding, for example. In contrast to the embodiment depicted in FIG. 2, the cover can also be connected to the predetermined breaking point or the connecting segment. The cover limits the displacement path of the journal inside the profiled sleeve. The connection between the cover and the profiled sleeve can also be formed as a predetermined breaking point.

If, in a crash, for example, a large axial force acts on the shaft sections 2 and 3 and thereby also on the profiled sleeves of the rolling displacement units 8 and 9, the respective predetermined breaking points 2a, 3a of the two rolling displacement units fail at the end of the displacement path of the rolling displacement units 8 and 9, as shown in FIG. 3. As a result, the profiled sleeve of each rolling displacement unit can be displaced into the corresponding shaft section 2 or 3 in a substantially force-free manner.

This prevents the jointed shaft 1 from buckling because the rolling displacement units 8 and 9 are guided in the shaft sections 2 and 3. The large axial length of the two rolling displacement units 8 and 9 combined makes it possible in such a crash-related failure of the two predetermined breaking points 2a, 3a to realize a very large additional displacement path (crash path), without the vehicle occupants being placed at risk.

FIGS. 4b to 4e show embodiments of a jointed shaft 1 where each has only a single rolling displacement unit 8 arranged near the center joint 4, while the other rolling displacement unit 9 is associated with one of the fixed constant velocity joints 5 or 6.

In FIG. 4b the rolling displacement unit 8 is positioned on the transmission-side shaft section 2 and arranged near the center joint 4. The intermediate bearing 7 is also provided on the transmission-side shaft section 2. The second rolling displacement unit 9 is arranged near the transmission-side fixed constant velocity joint 5, so that both rolling displacement units 8 and 9 are associated with the transmission-side shaft section 2. In this embodiment no axial forces act on the intermediate bearing 7.

In contrast, the rolling displacement unit 8 in the embodiment illustrated in FIG. 4c is arranged on the differential-side shaft section 3 and again positioned near the center joint 4. The second rolling displacement unit 9 is arranged near the transmission-side fixed constant velocity joint 5. In this embodiment an intermediate bearing 7 can be provided, either fixed to the transmission-side shaft section 2 or arranged near the center joint 4 on the journal 8c of the rolling displacement unit 8.

In the embodiments shown in FIGS. 4d and 4e, one rolling displacement unit 8 is positioned near the center joint 4 while the other rolling displacement unit 9 is provided near the differential-side fixed constant velocity joint 6. In the embodiment illustrated in FIG. 4d, similarly to the embodiment of FIG. 4c, the intermediate bearing 7 can be provided on what in the figure is either the right or the left side of the center joint 4. FIG. 4e, by contrast, shows only one intermediate bearing 7 positioned on the differential-side shaft section 3.

The special arrangement of the two rolling displacement units enables the longitudinal displaceability of the two shaft sections 2 and 3 relative to each other. This is necessary, for example, so that the jointed shaft 1 can be mounted to the previously installed transmission and rear axle gear (differential) in the vehicle. This can be achieved by providing a gear journal with splines (not depicted) at the transmission output, onto which the inner hub 5b of the transmission-side fixed constant velocity joint is placed during assembly. Likewise, the inner hub 6b of the differential-side fixed constant velocity joint 6 is pushed onto a rear-axle-side journal.

The longitudinal displaceability compensates any longitudinal displacements of the transmission in relation to the differential occurring during operating of the vehicle and any possibly occurring longitudinal vibrations. In addition, the longitudinal displaceability is also required to remove the shaft for repair and to compensate tolerances between the transmission and the differential.

In the embodiment depicted in FIG. 4a, the rolling displacement unit 8 compensates axial vibrations possibly introduced into the jointed shaft 1 from the transmission-side. This ensures that such axial vibrations are not introduced into the center joint 4 or the intermediate bearing 7. Because of the coupling using rolling elements, the rolling displacement unit 8 can fulfill this function even in case of very high torques or torque surges. There is no axial blocking, which is known to occur, for example, in external splined couplings. Likewise, the rolling displacement unit 9 compensates axial vibrations possibly introduced into the jointed shaft 1 from the rear axle gear (differential).

The full bilateral axial decoupling of the intermediate bearing 7 makes possible a very stiff design of the damper 7a in axial direction. Such a stiff design of the damper reduces harmful displacements of the intermediate bearing 7 or the central fixed constant velocity joint 4, such as under the action of acceleration forces.

The invention claimed is:

1. A jointed shaft comprising two shaft sections connected with each other in a rotationally fixed manner by a center joint constructed as a constant velocity fixed joint, wherein a further constant velocity fixed joint is arranged at the end of each shaft section which faces away from the center joint, said jointed shaft further comprising two roller displacement units, wherein
at least one of the roller displacement units is arranged adjacent the center joint and is comprised of a profiled sleeve provided on one of the shaft sections and a shaft member connected with the center joint; said profiled sleeve and said shaft member each being provided with axially extending grooves therein, whereby the grooves of the sleeve and the grooves of the shaft member are associated with each other in pairs, and rollers are disposed in the pairs of grooves for transmitting torque between the shaft member and the sleeve, and
the shaft member of one roller displacement unit is connected with an inner hub of the center joint and the shaft member of another roller displacement unit is connected with an outer hub of the center joint.

2. A jointed shaft as claimed in claim 1, wherein the two shaft sections are moveable in an axial direction relative to each other.

3. A jointed shaft as claimed in claim 1, wherein said two roller displacement units are associated with and arranged adjacent the center joint.

4. A jointed shaft as claimed in claim 1, wherein one of the two roller displacement units is associated with and arranged adjacent the center joint, and the other of the two roller displacement units is associated with and arranged adjacent one of the constant velocity fixed joints at the ends of the shaft sections facing away from the center joint.

5. A jointed shaft as claimed in claim 4, wherein both of the roller displacement units are associated with the same shaft section.

6. A jointed shaft as claimed in claim 4, wherein each of the two roller displacement units is associated with a different shaft section.

7. A jointed shaft as claimed in claim 1, wherein the two shaft sections are constructed at least partially in tubular form, and wherein each of the constant velocity fixed joints provided at the ends of the shaft sections facing away from the center joint comprises an outer hub which is connected to the respective shaft section on which the constant velocity fixed joint is provided.

8. A jointed shaft as claimed in claim 1, wherein the at least one roller displacement unit comprises a stop member for limiting axial displacement of the rollers.

9. A jointed shaft as claimed in claim 1, wherein the at least one roller displacement unit comprises a cage which limits movement of the rollers.

10. A jointed shaft as claimed in claim 1, wherein at least one roller displacement unit comprises a shaft member which is mounted in an intermediate bearing.

11. A roller displacement unit for a shaft, said roller displacement unit comprising a profiled sleeve and a shaft member inserted into said sleeve and axially displaceable therein; said profiled sleeve having radially outer guide tracks on an inner surface thereof, and said shaft member having radially inner guide tracks on an outer surface thereof; wherein said radially outer and inner guide tracks are associated with each other in pairs, and rollers are disposed in the pairs of radially outer and inner guide tracks for transmitting torque between the profiled sleeve and the shaft member; and wherein the profiled sleeve is connected to a connecting section for connecting the profiled sleeve to the shaft member through a predetermined breaking point, said connecting section having an internal diameter which is greater than or equal to the external diameter of the profiled sleeve, a cover is provided on the profiled sleeve, on the connecting section or on the predetermined breaking point, said cover closing off the profiled sleeve in the direction of the connecting section, and the cover is secured to the profiled sleeve, to the connecting section, or to the first predetermined breaking point through a further predetermined breaking point.

12. A roller displacement unit as claimed in claim 11, wherein said predetermined breaking point is constructed as a connecting region arranged radially between the inner surface of the profiled sleeve and an outer surface of the connecting section.

13. A roller displacement unit as claimed in claim 11, wherein the predetermined breaking point is formed by a weakened area in the connection between the profiled sleeved and the connecting section.

14. A roller displacement unit as claimed in claim 13, wherein said weakened area is formed by a constriction, notches or perforations.

15. A roller displacement unit as claimed in claim 11, wherein the profiled sleeve, the connecting section and the predetermined breaking point are constructed in such a manner that when a predetermined force which acts in an axial direction on the profiled sleeve is exceeded, the predetermined breaking point fails and the profiled sleeve is displaceable into the connecting section.

* * * * *